United States Patent [19]
Boschen et al.

[11] 3,788,472
[45] Jan. 29, 1974

[54] WASTE WATER PROCESS TANK CONTROL FACILITY

[75] Inventors: William O. Boschen, Tenafly; Otto A. Grieshaber, Pompton Lakes, both of N.J.

[73] Assignee: Ralph B. Carter Company, Hackensack, N.J.

[22] Filed: Feb. 3, 1972

[21] Appl. No.: 223,188

[52] U.S. Cl.............. 210/103, 210/134, 210/149, 210/219
[51] Int. Cl............................................. B01d 21/24
[58] Field of Search... 210/85, 87, 90, 93, 100, 103, 210/134, 135, 219, 149

[56] References Cited
UNITED STATES PATENTS

| | | | |
|---|---|---|---|
| 1,140,131 | 5/1915 | Norr | 210/85 X |
| 3,560,376 | 2/1971 | Heir | 210/219 X |
| 3,528,548 | 9/1970 | Shecklea | 210/103 |
| 2,490,533 | 12/1949 | McAlean | 210/103 X |

Primary Examiner—John Adee
Attorney, Agent, or Firm—Samuelson & Jacob

[57] ABSTRACT

A control facility for a waste water process tank having a normal operating mode wherein the system shuts down and indicates "fault" on malfunction and provides a stepped, sequential trouble shooting procedure for determining the fault and provides for temporary operation or partial operation of the system until the fault is corrected. The system is directed toward use in waste water treatment plants which utilize liquid mixing or liquid mixing and heating tanks.

3 Claims, 1 Drawing Figure

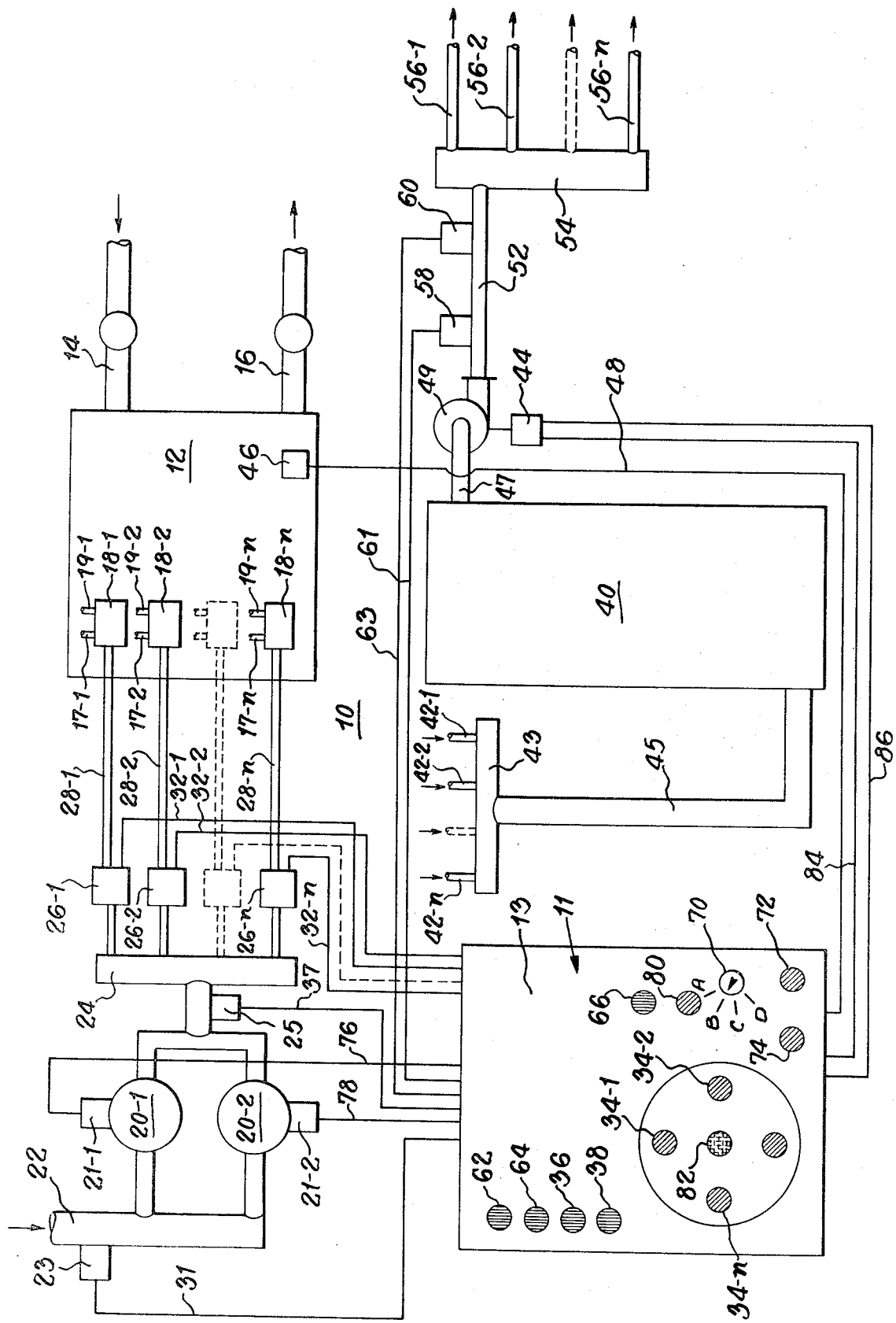

WASTE WATER PROCESS TANK CONTROL FACILITY

The invention relates to waste treatment systems and more particularly, to those systems which are used to treat waste water from human, animal or process waste systems. More specifically, the invention is a control system method for operating automatically in its normal mode, and for shutting down and indicating "fault" on malfunction. Still more specifically, the invention is directed toward such systems as may use anaerobic biological reactors (digesters) and/or aerobic waste water process tanks. In addition, the system provides a readily usable means for isolating the cause of the malfunction and for controlling operation on a temporary nonautomatic basis.

Prior art waste water treatment process control systems do not indicate a "fault" on malfunction and, generally, do not initiate automatic, controlled shut-down when there is a malfunction. Such systems usually continue to operate or attempt to operate even when one section is not operating properly. While this may or may not be damaging to the equipment, it does reduce the efficiency of the system and increases the necessity for human supervision of the operating elements and parameters on a very regular basis.

It is an important object of the invention to provide a control system for a waste treatment facility or a portion of a facility (such as an aerobic treatment tank or an anaerobic digester) which operates on an automatic basis and which shuts off upon malfunction and indicates "fault" upon such shutdown.

It is a further object of the invention to provide such a system wherein it is possible to locate the trouble by means of a stepped, sequential procedure and to operate on a temporary basis when required.

These and other objects, features, advantages and uses will be apparent during the course of the following description.

Broadly, the invention comprises a control box containing a control system having suitable relays and other elements and a panel with indicators mounted thereon which may be located in the control box or removed therefrom. Suitable sensors are located in critical portions of the system and the sensors are electrically connected to the control box to actuate indicators which are mounted on the panel and to aid in the localizing of trouble and the correcting of such trouble. Some of the sensors may also function as control devices and/or indicators during normal (nonmalfunction) operation. The control system shuts operation down on malfunction and controls the operation of the treatment system in its normal (automatic) condition or in a temporary condition after malfunction.

The FIGURE is a block diagram of a system of the invention used in connection with a waste treatment digester which is equipped with aero-hydraulic type mixer-heaters.

In the FIGURE, wherein, for the purpose of illustration, there is shown an embodiment of the invention used with a digester, the numeral 10 designates the system, generally. It is to be understood that the illustration of the invention with such a digester is not a limitation of the invention as it could be used with other waste treatment systems which can utilize mixing or mixing and heating as a normal part of their operation.

Digester 12 is fed from an input line 14 and is emptied through discharge line 16 by means of suitable valves and controls which are not a part of this invention. There are a plurality of mixers 18–1, 18–2, . . . . 18–n suitably mounted in digester 12. By way of example, these guns may be of the type described in U.S. Pat. Nos. 2,967,399, 3,148,509 and 3,246,761. The guns are provided with heating water intake lines 17–1 . . . . 17–n and water discharge lines 19–1 . . . . 19–n, there being one such line for each mixer-heater. There are two compressors 20–1 and 20–2 which are fed from a common gas input line 22 and feed a gas manifold 24. The system sometimes operates with one compressor and sometimes with both as will be apparent as this description proceeds. The gas supplied to line 22 may be from any suitable source, as, for example, from the digester 12, from the atmosphere or from a supply of a gas or a gas mixture.

A sensor 23 is mounted in line 22 to detect when the pressure in the line is below a predetermined value. If the pressure goes below this predetermined value, a signal is applied to a line 31 which terminates in the control system mounted in control box 11. The control system shuts down the system, lights fault red light 66 and lights red light 36. Both lights are mounted on the panel 13 of control box 11.

The compressor motors 21–1 and 21–2 are connected by lines 76 and 78, respectively, to control box 11 and through the control system to green lights 72 and 74 on panel 13. These lights indicate which of the compressors is running. Both compressors are connected to a gas manifold 24 at whose input there is located a pressure sensor 25 which determines if the discharge pressure from the compressors is within predetermined limits. If the pressure is outside these limits, a signal is transmitted to the relay control system in control box 11 through line 37. The system is shut down and the fault light 66 and red light 38 on panel 13 are lit.

The output of gas manifold 24 is fed to a plurality of motorized valves 26–1 . . . . 26–n which are individually connected to each mixer 18–1 . . . . 18–n through gas lines 28–1 . . . . 28–n respectively.

In normal (automatic) operation, green lights 34–1 . . . . 34–n light when the associated valve 26–1 . . . . 26–n is open. Signal is fed to the control system and lights through the associated lines 32–1 . . . . 32–n.

If one of the valves 26 fails to open, a signal is transmitted through the associated line to the relay control system and the system is shut down and the fault light 66 is lit.

An aquastat 46 is located in digester 12 and when the temperature in the tank is below a certain value, it calls for heat to be supplied to the input lines 17–1 . . . . 17–n from a heat source, such as a boiler 40. This is accomplished by means of a control signal transmitted over line 48 to the control system. A signal is now transmitted over a line 84 to a motor 44 which turns the motor on. When motor 44 goes on, a signal is transmitted to control box 11 over line 86 and an amber light 82 on panel 13 is lit to indicate that motor 44 is running. Pump 49 is connected to heat source 40 by means of a line 47 and to a water manifold 54 by means of a line 52.

A water temperature sensor 58 and a water flow sensor 60 are mounted in line 52. If the temperature exceeds a predetermined value, a signal is transmitted to the control system over a line 61 to thereby shut the system off and light the fault light 66 and a red light 62. If the water flow drops below a certain value, a signal is transmitted to the control system over line 63 to shut off the system, light the fault light and a red light 64.

Water is fed from water manifold 54 to the water inputs 17–1 . . . . 17–n through the associated lines 56–1 . . . . 56–n. Similarly, water is fed to boiler 40 from lines 19–1 . . . . 19–n through lines 42–1 . . . . 42–n, manifold 43 and line 45.

Operation of the system proceeds as follows: Switch 70 on panel 13 is moved from position B (OFF-RESET) to position A (ON-AUTOMATIC). In this position, operation proceeds in a programmed manner in accordance with the teachings of U.S. Pat. No. 3,356,347 which issued to William O. Boschen on Dec. 5, 1967 and is assigned to the assignee hereof. As the automatic operation proceeds, green light 80 will remain lit and the green lights 34–1 . . . . 34–n will be lit during the times that their associated valves 26–1 . . . . 26–n are open and gas is being supplied to the appropriate mixers 18–1 . . . . 18–n through lines 28–1 . . . . 28–n. The light associated with the operating compressor will also be lit. When the system calls for heat from boiler 40, both compressors come on and all mixers operate simultaneously. All green lights and the amber heating light 82 will remain lit. When the temperature in the tank reaches a predetermined value, the pump is turned off, one of the compressors turns off and the system returns to automatic, programmed operation at the point at which the system would have been if there has been no intermediate heating step.

If the water temperature and the fault light are lit, suitable correction of the fault probably should be carried on in the system before attempting operation with heat. If the water temperature light and the fault light are lit, the system was shut down because the water temperature was too high. If the cause cannot be readily corrected, it is possible to operate the system without heat as will be apparent further in this description. Under certain over-heat conditions, the system may be operated with heat on a temporary basis but such operation is not recommended if it can be avoided without long shut-down pending repair. If the water flow and the fault lights are illuminated, there is no water flow from the boiler and the problem should be corrected before attempting to operate with heat or in the automatic position.

If the fault light and the suction pressure lights are illuminated, there is low pressure in the suction line which should be corrected before attempting normal operation. If the discharge pressure and the fault lights are illuminated or the fault light alone is illuminated, the trouble may be in the compressor discharge side of the system. If the system is shut down by the control system, the fault light is lit and none of the red lights are lit, the operator should press each lamp on the panel in to test it. These lamps are "press to test" lamps and those which do not light must be replaced before proceeding further with trouble shooting.

When only the fault light is on, move switch to position B (OFF-RESET) for one minute. Next, set switch to position C (ALL-NO HEAT). In this position, both compressors are on and all the mixers should operate. If one compressor light fails to light, then that compressor shut down the system. If any of the mixer lights are out, then the valve connected to that mixer failed to open and it should be checked. If both compressor lights illuminate and all the mixer lights illuminate, then the cause of the malfunction is somewhere else in the compressor discharge piping (probably a plugged line).

It is possible to operate the system on a temporary basis before or after the cause of the malfunction has been located. In these circumstances, all elements operate except for the element which was inoperative and caused the shut-down. With switch 80 in position C (ALL-NO HEAT), the system will operate with both compressors and all mixers on and with the heating system off. In position D (ALL-WITH HEAT) of switch 70, all the mixers, both compressors and the heating system are on. Operation should not, as a matter of good practice, be carried on in the ALL-WITH HEAT position unless most of the mixers are operative.

As various changes could be made in the above construction without departing from the scope of the invention, it is intended that all matter contained in the above description or shown in the accompanying drawing shall be interpreted as illustrative and not in a limiting sense. An illustrative, but not limiting example of such a change within the scope of this invention would be a system utilizing a single compressor, or a system with more than two compressors.

The embodiments of the invention in which an exclusive property or privilege is claimed are defined as follows.

1. In a waste water treatment system having a tank for receiving and treating the water and/or sludge to be treated and a plurality of mixers mounted in the tank to be operated in accordance with a predetermined program, the improvement which comprises:

at least one compressor driven by an electric motor;

an indicator connected to the electric motor to indicate when the motor is running;

a gas manifold connected to the output of the compressor;

a plurality of valves and gas lines connected to the gas manifold, there being one valve and one gas line for each mixer each such valve being connected to its associated mixer;

means for supplying gas to the input of the compressor;

a suction pressure sensor mounted in the means for supplying gas to the compressor for determining when the pressure is below a certain predetermined value;

a discharge pressure sensor mounted between the compressor and the manifold for determining when the pressure therein is between predetermined limits;

an indicator connected to each of the valves of the plurality of valves to indicate that the particular valve is open and gas is being supplied to the associated mixer;

a control system connected to the sensors to shut down the system when any of the sensors detects an out of limit condition and to display the fact that the particular sensor has detected an out of limit condition; and an indicator connected to the system to display the fact that an out of limit condition exists.

2. The invention of claim 1 including:

a second compressor driven by an electric motor connected to the means for supplying gas and the gas manifold;

an indicator connected to the electric motor of the second compressor to indicate that said motor is running; and means in the control system for controlling the operation of the compressors so that one or both of them operate in accordance with the demands of the system.

3. The invention of claim 2 including:

a boiler having means for receiving cold water and a pump connected to its output for delivering hot water;

a water manifold and a line connected between the pump and the water manifold;

a temperature sensor connected in said line for determining when the temperature of the water in the line is over a predetermined value and connected to the control system to thereby shut down the system and to display the fact that the temperature of the water is above said value;

a water flow sensor connected in said line for determining when the water flow in said line is below a certain predetermined value and connected to the control system to thereby shut down the system and to display the fact that the flow of the water is below said value;

a pump indicator to display the fact that the pump is running;

an aquastat mounted in the tank connected to the control system and then to the pump to turn on the pump when the temperature in the tank is below a predetermined value;

a plurality of water lines connected to the water manifold, there being one water line for each such mixer; each such water line being connected to its associated mixer.

* * * * *